United States Patent [19]

Geary et al.

[11] Patent Number: 5,772,259
[45] Date of Patent: Jun. 30, 1998

[54] SLIDE ASSEMBLY WITH TELESCOPING FLUID CONDUITS WITH IMPROVED SEALING ARRANGEMENT

[75] Inventors: James Geary, Fairfield; Charles Smart, Brookfield, both of Conn.

[73] Assignee: Robohand, Inc., Monroe, Conn.

[21] Appl. No.: 718,280

[22] Filed: Sep. 20, 1996

[51] Int. Cl.⁶ .................................................. F16L 27/12
[52] U.S. Cl. ...................... 285/145.1; 285/302; 285/321; 384/16; 277/582; 277/580
[58] Field of Search .................................. 285/298, 165, 285/302, 321, 349, 145.1, 145.4, 144.1; 277/188 R, 165, 177, 189, 567, 580, 582, 589; 384/16, 42

[56] References Cited

U.S. PATENT DOCUMENTS

| | | |
|---|---|---|
| 1,824,422 | 9/1931 | Badger . |
| 2,521,127 | 9/1950 | Price ..................................... 285/302 X |
| 2,900,436 | 8/1959 | Appleton . |
| 2,985,467 | 4/1961 | Cable, Jr. et al. . |
| 3,466,062 | 9/1969 | Deplante . |
| 4,099,670 | 7/1978 | Cole et al. . |
| 4,548,427 | 10/1985 | Press et al. . |
| 4,932,686 | 6/1990 | Anderson, Jr. . |
| 5,052,721 | 10/1991 | Gorman, Jr. . |
| 5,098,133 | 3/1992 | Glover . |
| 5,248,172 | 9/1993 | Wilson . |
| 5,584,488 | 12/1996 | Lembcke ......................... 277/188 R X |

FOREIGN PATENT DOCUMENTS

| | | |
|---|---|---|
| 916251 | 6/1954 | Germany ........................... 277/188 R |
| 1020699 | 2/1966 | United Kingdom ................... 285/165 |

Primary Examiner—Heather Shackelford
Attorney, Agent, or Firm—Fattibene and Fattibene; Arthur T. Fattibene; Paul A. Fattibene

[57] ABSTRACT

An actuating slide assembly for an automatic assembly machine, wherein the slide assembly includes telescoping fluid conducting conduits interconnected between the slide body and associated end block mounted for relative reciprocal movement relative to the slide body and a sealing arrangement for effecting a fluid tight seal between the relative movable telescoping conduits and associated slide body and end block. The sealing arrangement includes a sealing cartridge and associated O rings circumscribing one of the telescoping fluid conduits intermediate the opposed ends thereof to prohibit any leakage between the relative movable telescoping conduits and the associated slide body and a second sealing arrangement connecting the outer end of a telescoping conduit to its associated end block in a manner to provide a leakproof seal therebetween. The respective sealing arrangements also allow for a limited amount of play or vibration to occur when the slide assembly is in operation without the loss or leakage of fluid pressure at the seals.

11 Claims, 2 Drawing Sheets

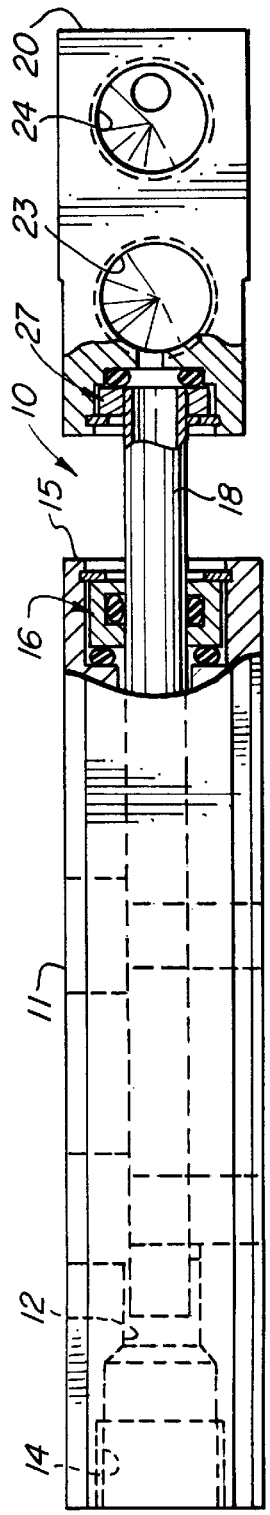
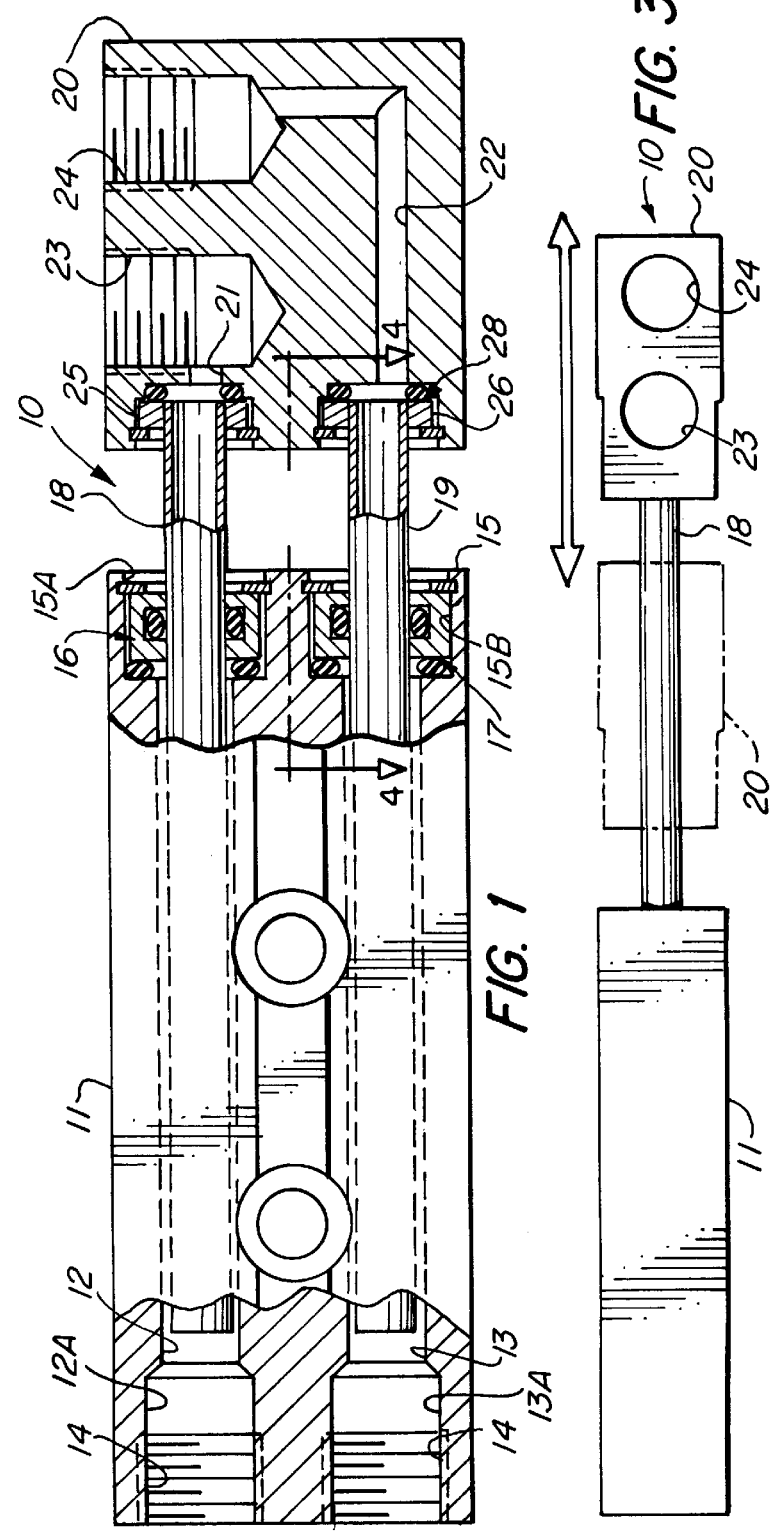
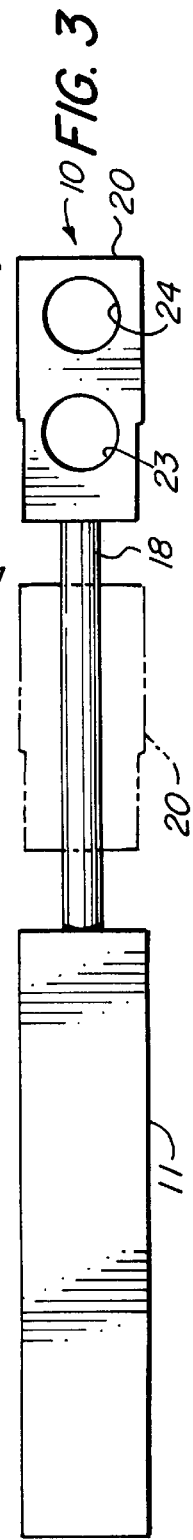

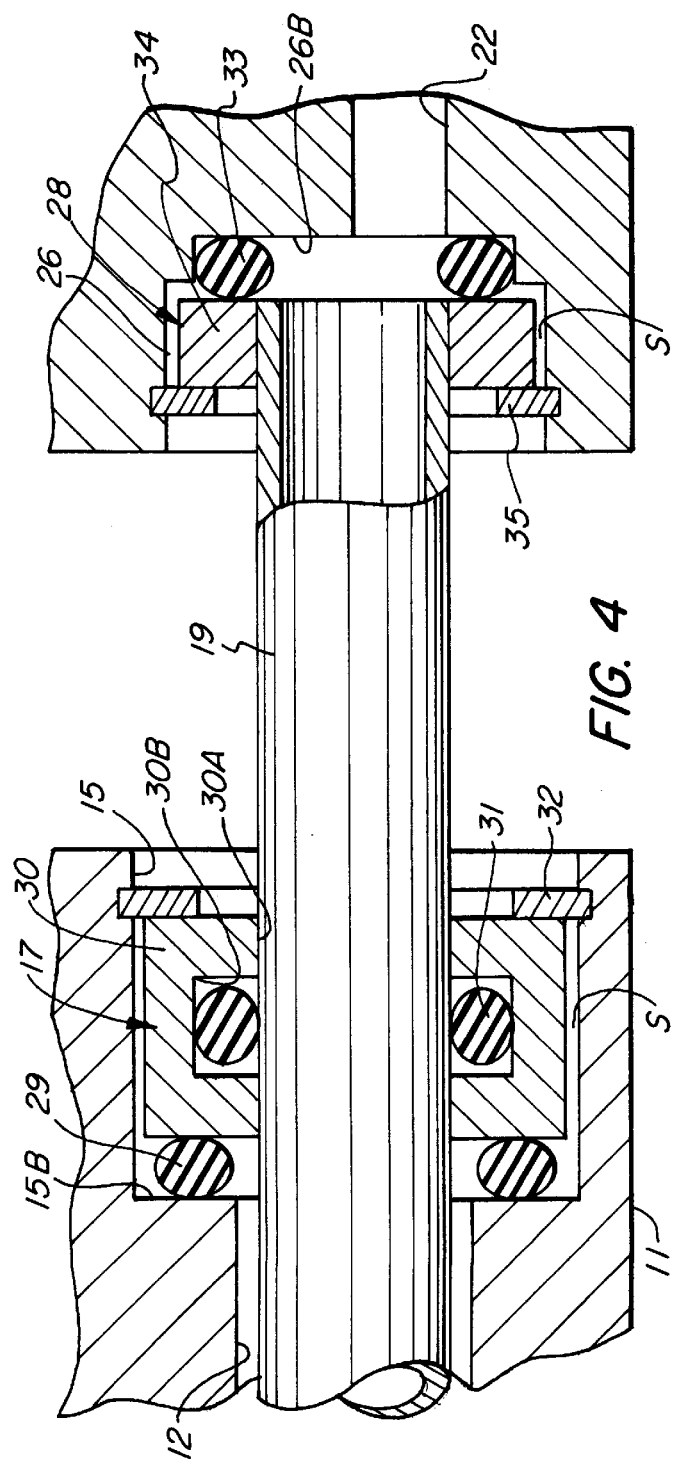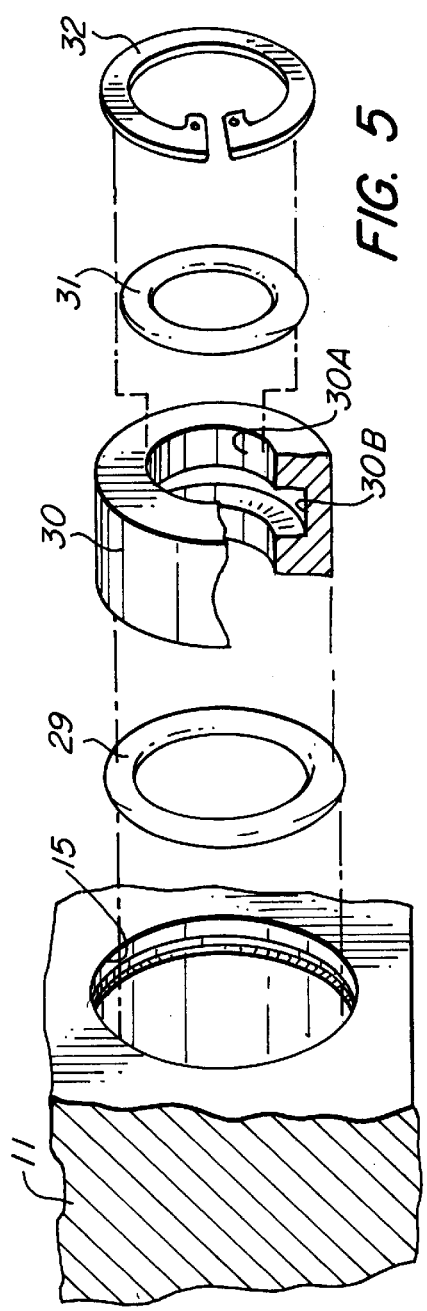

SLIDE ASSEMBLY WITH TELESCOPING FLUID CONDUITS WITH IMPROVED SEALING ARRANGEMENT

FIELD OF THE INVENTION

This invention is directed to a slide assembly for use with automatic assembly machines, and more specifically to a slide assembly having telescoping conduits for conducting a fluid medium or pressure to the operating device adapted to be connected to the slide assembly and having sealing means circumscribing one of the telescoping conduits intermediately thereof and at the outer free end thereof to prevent any loss of fluid pressure therebetween during operation and at the same time allowing for a limited amount of play or vibration to occur without any leakage occurring at the seals.

PROBLEM AND PRIOR ART

In the automated machine tool art, slide assemblies are frequently used to position a work gripping device or other machine part in accordance to a predetermined program. The work gripping device on such automated machine tool utilizes a fluid pressure, e.g. compressed air or hydraulic fluid, to actuate the desired machine part or gripping device. Heretofore, such operating gripper devices were connected to flexible conduits through which the actuating fluid medium was directed to the gripping device positioned by a slide assembly. Such flexible conduits were frequently troublesome and cumbersome and occupied a considerable amount of space. As well as fatigue failure during repetitive cycling.

SUMMARY OF THE INVENTION

An object of this invention is to provide a slide assembly having incorporated therein telescoping fluid conduits for directing the actuating medium directly to the operating tool adapted to be attached thereto and having sealing means for providing a leakproof seal between the telescoping conduits and associated slide components.

Another object of this invention is to provide a slide assembly for use with an automatic assembly machine having telescoping fluid conduits interconnecting a slide body with an associated end block mounted for relative reciprocal movement with a sealing assembly that prohibits any loss of fluid pressure between the telescoping conduits and associated slide components while at the same time permitting for a limited or predetermined amount of play or vibration to occur therebetween.

Another object is to provide a slide assembly having telescoping fluid conduits that are sealed so as to prohibit any fluid leak between the slide components and its associated conduit and between the nested telescoping conduits.

Another object is to provide a slide assembly having nested telescoping fluid conduits mounted for relative reciprocal movement that are sealed in a manner to allow flexing or movement of the fluid conduits to occur without breaking the seal.

Another object is to provide a slide assembly having telescoping conduits for directing a fluid actuating medium that is relatively simple in construction, easy to fabricate and positive in operation.

The foregoing objects and other features of this invention are obtained by a slide assembly which includes a base or slide body and an associated end block interconnected by telescoping conduits. The base or side body includes one or more bores to define a segment of the telescoping conduit. One end of the slide body is counter bored to define an enlarged seat for receiving a sealing assembly circumscribing the intermediate outer periphery of a second conduit which is disposed in telescoping or nested position relative to its corresponding bore which defines the first mentioned conduit segment to seal against any fluid leakage between the relative movable telescoping conduits and associated slide body. The associated movable end block of the slide assembly is also provided with a counterbore forming a seat for the seal assembly which secures and seals the outer free end of the nested or telescoping conduit to its associated movable end block. The respective counterbores defining the seats for the respective seals are formed with a diameter which is slightly greater than the diameter of its corresponding seal assembly so as to allow for a limited amount of play or vibration to occur between the movable members of the slide assembly without breaking the seal formed by the respective sealing assemblies.

IN THE DRAWINGS

FIG. 1 is a plan view of a slide assembly embodying the invention and having parts shown in section.

FIG. 2 is an end view of FIG. 1 and having parts shown in sections.

FIG. 3 is a diagrammatic side view of the slide assembly illustrating a range of reciprocal movement between the base slide member and its associated end block interconnected by the telescoping fluid conducting conduits.

FIG. 4 is an enlarged detail sectional view taken along line 4—4 on FIG. 1.

FIG. 5 is an exploded perspective view of the left sealing assembly as viewed in FIG. 4.

DETAILED DESCRIPTION

Referring to the drawings, there is shown in FIGS. 1 to 5 a slide assembly 10 embodying the invention. Such slide assemblies are utilized in an automatic assembly machine for picking and placing a work piece or part in accordance with a predetermined program. Fluid pressure, e.g. compressed air, is utilized to effect the actuation of a pick and place workpiece device adapted to be used with the slide assembly herein described.

In the illustrated embodiment, the slide assembly 10 comprises a base slide body or housing 11 having one or more bores or passageways, each defining a conduit, e.g. 12 and 13, extending therethrough. One end 12A, 13A of the respective bores or conduit 12 and 13 is provided with internal threads 14 or other suitable coupling means to which a fluid supply line (not shown) can be readily connected to supply the actuating fluid or medium to the associated conduit 12 and 13. The other end 15 of the slide body 11 is provided with a counterbore 15A, 15B circumscribing the respective conduit 12 and 13. As will be hereinafter described, the counterbore 15A, 15B defines a seat for a sealing assembly 16 and 17. As will be hereinafter described, sealing assemblies 16 and 17 are similar in construction.

Disposed in nested and telescoping arrangement within each of the respective conduits 12 and 13 is an inner or telescoping conduit 18 and 19. The respective inner conduits 18 and 19 are slidably disposed and linearly movable relative to the outer conduits 12 and 13 to define an extension of the conduits 12 and 13. Connected to the outer ends of the conduit 18 and 19 is an end block 20. Adapted to be connected to the movable end block 20 is a suitable pick and place device, e.g. a gripper (not shown) for gripping and placing a work piece in accordance with a predetermined program. The end block 20 is also provided with suitable fluid passageway 21 and 22 disposed in communication with suitable outlets 23, 24, through which the fluid pressure or activating fluid may be directed to the work handling device or gripper (not shown) which is adapted to connect to the mounting or end block 20.

Formed in the end block 20 for receiving the outer free end of the respective conduits 18 and 19 are counterbores 25, 26 to define a seat for receiving an end sealing assembly 27, 28 respectively. As will be hereinafter described, the end sealing assembly 27, 28 are similar in construction.

Reference is made to FIGS. 4 and 5, wherein the sealing assembly 17, which is similar in construction with sealing assembly 16, is illustrated in detail. As shown, the respective sealing means or sealing assemblies 16 and 17 include a resilient O ring 29 disposed in sealing relationship between the bottom of the counterbore 15B and a sealing cartridge 30. The sealing cartridge 30 comprises an annular member, preferably formed of a suitable plastic material, e.g. TEFLON, having a central opening 30A arranged to circumscribe an intermediate portion of conduit 18 or 19. The arrangement is such that the conduit 18 or 19 is disposed in sliding relationship relative to its respective sealing cartridge 30. Disposed within the sealing cartridge 30 is an internal annular groove 30B in which there is confined a sealing ring 31 arranged to circumscribe the outer circumference of the inner conduit 18 or 19. It will be understood that the groove 30B and the sealing O ring 31 are proportioned so that the sealing O ring is loaded to a predetermined force so as to insure a fluid tight seal about the outer circumferential portion of the conduits 18 or 19. The sealing O ring 29 and the sealing cartridge 30 and its associated O ring 31 are retained within the respective counterbores 15A, 15B by a retainer ring 32 engaging an internal retaining groove formed in the respective counterbores 15A, 15B. It will be understood that the sealing cartridge is proportioned so as to preload the sealing O ring 29 with a predetermined force in the retained position so as to insure a fluid tight seal between the bottom of the counter bore 15B and the sealing cartridge 30.

In order to provide for limited play or vibration that may occur between the slide body 11 and the end block 20 during operation, the counterbores 15 and 15A are formed with a diameter which is slightly greater than the diameter of the sealing cartridge 30, as best seen in FIG. 4 to define a predetermined space S therebetween.

The respective end sealing means or sealing assemblies 27, 28 connecting the respective conduits 18, 19 to the associated end block 20 comprise a sealing O ring disposed in a fluid tight sealing position between the bottom 26B of counterbore 26 and a pressure flange 34 connected to the free outer end of conduit 19 or 18. A retainer ring 35 secures the end sealing assembly 27 and 28 to the end block 20, as hereinbefore described.

As best seen in FIG. 4, the major diameter of the counterbore 26 is slightly greater than the outer periphery of the pressure flange 34, which permits the free outer end of conduit 18 or 19 to move or play within its respective counterbores 25, 26 within predetermined limits as defined by the space S formed between the inner circumscribing walls of the counterbores 25, 26 and the outer periphery of pressure flange 34.

In the construction described, it will be apparent that the sealing assembly 16 and 17 are formed to prohibit any tendency of fluid pressure to leak between the telescoping conduits and the outer periphery of the sealing cartridge. The sealing O ring 29 prohibits loss of fluid pressure between the nested conduits and the outer periphery of the sealing cartridge 30. Any tendency of fluid pressure leaking between the nested or telescoping conduits is prohibited by sealing O ring 31.

The end seal assembly 28 is proportioned so that when installed within the counterbore 26, the pressure flange 34 will impart a predetermined load on the sealing O ring 33 to ensure a fluid tight seal thereat.

In operation, the space S defined between the sealing assemblies 16 and 17 relative to their respective counterbore seats 15A, 15B and between the end seal assemblies 27, 28 and their respective counterbore seats, provides for a limited mount of play or vibration to occur during operation of the slide assembly without causing any break of the fluid tight seals as described herein.

While the present invention has been described with respect to a particular embodiment, it will be understood that variations and modifications may be made without departing from the spirit or scope of this invention.

What is claimed is:

1. A slide assembly for use on a tool machine comprising:
   a slide body having a counterbore,
   a passageway extending through said slide body defining a first conduit for directing a fluid medium therethrough disposed in alignment with said counterbore,
   a second conduit slidably mounted relative to said first conduit,
   said second conduit adapted to slide between a protracted position and a retracted position relative to said slide body,
   said second conduit having a free outer end,
   an end block having a counterbore forming a seat which receives said free outer end,
   a first sealing means circumscribing an intermediate circumferential portion of said second conduit within said counterbore of said slide body to form a fluid tight seal thereat,
   and a second sealing means disposed within said counterbore of said end block forming a fluid tight seal between said free outer end of said second conduit and said end block,
   said respective counterbores having a diameter slightly greater than said respective first and second sealing means disposed in said respective counterbores defining a space therebetween for allowing for a predetermined amount of play of said first and second sealing means relative to said slide body and said end block respectively without effecting the efficacy of said first and second sealing means.

2. A slide assembly for use with automated tool machines and comprising:
   a slide body having a bore extending therethrough to define a conduit for directing a fluid medium therethrough, said bore having an inlet end and an outlet end,
   an enlarged counterbore circumscribing the outlet end of said conduit to define a seal seat,
   a telescoping conduit slidably disposed relative to said conduit for movement between a protracted and retracted position relative thereto,
   said telescoping conduit having a free outer end, an end block, said end block having an enlarged counterbore which receives the free outer end of said telescoping conduit, a first sealing assembly circumscribing an intermediate circumferential portion of said telescoping conduit, said first sealing assembly including a sealing cartridge having a central opening for receiving said telescoping conduit in sliding relationship, a groove formed in said cartridge about said opening, a first sealing O ring confined in said groove forming a fluid tight seal about the circumference of said telescoping conduit, and a second sealing O ring interposed between said cartridge and said slide body within said slide body counterbore to define a fluid tight seal thereat, said slide body counterbore having a bottom and a diameter slightly greater than the diameter of said sealing cartridge disposed therein to define a space therebetween, said second sealing O ring interposed between said sealing cartridge and said bottom of said body counterbore to form a seal thereat, and a retainer for securing said sealing cartridge within said body counterbore, and a second sealing assembly disposed about the free outer end of said telescoping conduit, said second sealing assembly including a pressure flange connected to said free outer end of said telescoping conduit, a sealing ring interposed between said pressure flange and said counterbore formed in said end block, and a snap ring retainer for securing said pressure flange and said sealing ring to said end block in fluid tightrelationship, and said pressure flange having a diameter slightly less than the diameter of said end block counterbore to define an annular space therebetween.

3. A slide assembly for use on a tool machine comprising, a slide body having a counterbore.

a passageway extending through said slide body defining a first conduit for directing a fluid medium therethrough disposed in alignment with said counterbore, a second conduit slidably mounted relative to said first conduit, said second conduit adapted to slide between a protracted position and a retracted position relative to said slide body, said second conduit having a free outer end, an end block having a counterbore forming a seat which receives said free outer end, a first sealing means circumscribing an intermediate circumferential portion of said second conduit within said counterbore of said slide body to form a fluid tight seal thereat, and a second sealing means disposed within said counterbore of said end block forming a fluid tight seal between said free outer end of said second conduit and end block, said respective counterbores having a diameter slightly greater than said respective first and second sealing means disposed in said respective counterbores defining a space therebetween for allowing a predetermined amount of play of said first and second sealing means within their respective counterbores while maintaining said fluid tight seal thereat, where in said first sealing means includes an annular sealing cartridge circumscribing said intermediate portion of said second conduit, whereby said second conduit is disposed in sliding relationship with respect thereto, said cartridge having an internal circumscribing sealing groove, a first sealing O ring confined in said sealing groove, said sealing groove and said first sealing O ring being proportioned so that said first sealing O ring effects a fluid tight seal about said intermediate portion of said second conduit, and a second sealing O ring disposed between said sealing cartridge and said slide body to define a fluid tight seal therebetween, and means for securing said sealing cartridge for imparting a predetermined load on said second sealing O ring to effect a fluid tight seal between said sealing cartridge and said slide body.

4. A slide assembly as defined in claim 3 wherein said securing means comprises a snap fit retaining ring.

5. A slide assembly comprising:

a slide body, a passageway extending through said slide body defining a conduit for directing a fluid medium therethrough, a second conduit slidably mounted relative to said first conduit, said second conduit adapted to slide between a protracted position and a retracted position relative to said slide body, said second conduit having a free outer end, an end block connected to said free outer end, and a first sealing means circumscribing an intermediate circumferential portion of said second conduit within said slide body to form a fluid tight seal thereat, and a second sealing means forming a fluid tight seal between said free outer end of said second conduit and said end block, said first sealing means includes an annular sealing cartridge circumscribing said intermediate portion of said second conduit, whereby said second conduit is disposed in sliding relationship with respect thereto, said cartridge having an internal circumscribing sealing groove, a first sealing O ring confined in said sealing groove, said sealing groove and said first sealing O ring being proportioned so that said first sealing O ring effects a fluid tight seal about said intermediate portion of said second conduit, and a second sealing O ring disposed between said sealing cartridge and said slide body to define a fluid tight seal therebetween, and means for securing said sealing cartridge for imparting a predetermined load on said second sealing O ring to effect a fluid tight seal between said sealing cartridge and said slide body, said securing means comprising a retaining ring, and said second sealing means includes a pressure flange connected to said free outer end of said second conduit, a third sealing O ring disposed between said flange and said end block, and a split retaining ring securing said second sealing assembly and said second circuit to said end block.

6. A slide assembly as defined in claim 5 wherein said end block is counterbored to define an enlarged seat, and said pressure flange having a diameter which is slightly less than the diameter of said counterbore in said end block.

7. A slide assembly as defined in claim 6 wherein said pressure flange is proportioned to impart a predetermined load on said sealing O ring disposed between said pressure flange and said end block to maintain a fluid tight seal between said end block and said pressure flange.

8. A slide assembly for use with automated tool machinery and comprising:

a slide body and an associated end block, a telescoping conduit interconnecting said slide body and said associated end block for relatively reciprocal movement therebetween, said slide body and said associated end block each having a counterbore formed therein, said slide body having a passageway defining a conduit disposed in alignment with the counterbore formed in said slide body for conducting a fluid medium therethrough, said telescoping conduit being disposed in a nested sliding relationship relative to said passageway defining said conduit to extend between a protracted and retracted position, said telescoping conduit having a free outer end received in the counterbore formed in said end block, and a first sealing means disposed in said counterbore circumscribing an intermediate portion of said telescoping conduit to define a fluid tight seal between said telescoping conduit and said slide body, and a second sealing means disposed in the counterbore of said end block for connecting said free outer end of said telescoping conduit to said end block and forming a fluid tight seal thereat, and a snap fit retaining ring for securing each of said first and second sealing means within their respective counterbores.

9. A slide assembly as defined in claim 8 wherein said counterbores of said slide body and said end block have a diameter slightly greater than the diameter of the respective sealing means disposed therein.

10. A slide assembly as defined in claim 8 wherein said first sealing means comprises:

a sealing cartridge having a central opening for slidably receiving said telescoping conduit, said cartridge having an internal groove circumscribing said opening, a first sealing O ring confined in said groove forming a fluid tight seal with said telescoping conduit, a second sealing O ring disposed between said cartridge and said slide body to form a fluid tight seal therebetween.

11. A slide assembly as defined in claim 10 wherein said second sealing means includes:

a pressure flange connected to said free outer end of said telescoping conduit, a third sealing O ring disposed between said pressure flange and connected to said end block.

* * * * *